Patented May 15, 1951

2,553,417

UNITED STATES PATENT OFFICE 2,553,417

ADDUCTS OF QUINONES AND DIALKYL PHOSPHITES

Elbert C. Ladd and Merlin P. Harvey, Passaic, N. J., assignors to United States Rubber Company, New York, N. Y., a corporation of New Jersey No Drawing. Application February 23, 1950, Serial No. 145,896

10 Claims. (Cl. 260—461)

This invention relates to new chemical compounds, namely, adducts of 1,4-quinones and dialkyl phosphites, and a process of making the same. This application is a continuation-in-part of our copending application Serial No. 38,177, filed July 10, 1948.

We have discovered that quinones in which the quinonoid oxygen atoms are in the 1- and 4-positions may be caused to react with dialkyl phosphites to give adducts thereof which have utility as antioxidants for natural and synthetic rubber, gasoline, lubricating oils, etc.

Any quinone having the quinonoid oxygen atoms in the 1- and 4-positions may be employed in the practice of the present invention. We generally employ the more commonly available quinones of this type, namely, p-benzoquinone or alpha-naphthoquinone. We may use quinones which are substituted on the ring with substituent groupings which do not interfere with the addition with the dialkyl phosphites. It is preferred that at least one position on the ring between the two quinonoid oxygen atoms be unsubstituted. An example of a substituted quinone which may be employed is 2-methyl-alpha-naphthoquinone; the presence of the methyl group in the 2-position in this compound does not interfere with the addition reaction desired.

Any dialkyl phosphite may be used in the practice of our invention. The alkyl groups are generally the same but they may be different. Alkyl groups having from 1 to 20 carbon atoms or even more may be used. For reasons of economy and availability, we generally use the lower alkyl groups such as methyl, ethyl, propyl, etc.

The relative proportions of the quinones and the dialkyl phosphites may vary widely. It has been found that the 1:1 adduct is substantially the sole addition product formed regardless of the relative proportions of quinones and dialkyl phosphite employed. We generally use approximately equimolar proportions of the reactants, there being no good reason for wide departure from this ratio.

The reaction may be executed by simply heating a mixture of the quinone and the dialkyl phosphite in the presence of a basic catalyst. Suitable basic catalysts are those in the group consisting of alkali and alkaline earth metals, e. g., lithium, sodium, potassium, magnesium and calcium, and their oxides, hydroxides and alcoholates, and organic nitrogen bases, e. g., pyridine, piperidine and quaternary ammonium hydroxides, such as benzyltrimethylammonium hydroxide.

The preferred catalyst is an alkali metal, especially metallic sodium, which may be dissolved in the dialkyl phosphite to form a solution which may be commingled with the quinone.

The amount of the catalyst employed may vary within wide limits. Generally speaking, we use an amount ranging from 0.05 to 2% by weight of the catalyst based on the weight of the dialkyl phosphite.

The addition reaction of the present invention is strongly exothermic, so that it is usually necessary to employ effective cooling during the early portion of the reaction in order to prevent too high a rise in temperature. Generally speaking the reaction temperature is maintained between 50° C. and 125° C. After the reactants have been commingled, the reaction mixture may be heated, as by means of a steam bath, for a suitably extended period of time to complete the reaction. We prefer to employ a suitable inert organic liquid, typified by dioxane, as a solvent and diluent for the reaction mixture. Such solvent and diluent should be a solvent for both the quinone and the dialkyl phosphite.

When reaction is complete, the adduct is recovered from the reaction mixture in any suitable manner.

While we are not limited to any theory as to the mechanism of the reaction, we believe that the adducts are hydroquinones. For example, we believe that the reaction of diethyl phosphite with p-benzoquinone in the presence of metallic sodium proceeds as follows:

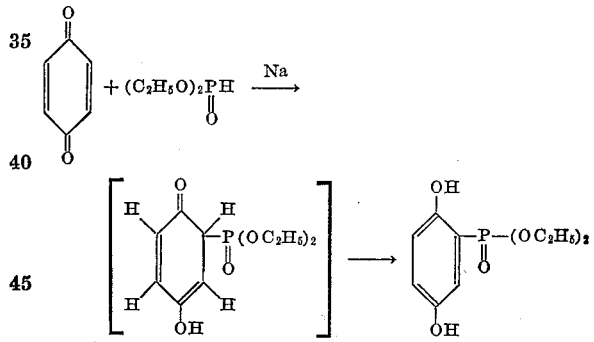

It will be seen that the postulated mechanism involves the 1,4-addition of the diethyl phosphite to the group

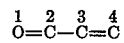

so that the hydrogen which was attached to phosphorus converts the 4-quinonoid oxygen substituent to hydroxyl, and the residue of the diethyl phosphite adds in the 2-position, followed by rearrangement of the postulated intermediate to the hydroquinone derivative shown.

The following examples illustrate our invention in more detail.

EXAMPLE 1

*1:1 adduct of p-benzoquinone and diethyl phosphite*

One gram of metallic sodium is dissolved in 69.07 grams of diethyl phosphite. After the sodium has dissolved a solution of 54.04 grams of p-benzoquinone in 300 ml. of dioxane is added with stirring at such a rate that the temperature of the reaction mixture is maintained at 60–70° C. Two hours are required for the addition. The reaction mixture is then concentrated in vacuo to yield 122.5 grams of amber colored liquid; $n_D^{20}$ 1.4492.

*Analysis.*—Calcd. for $C_{10}H_{15}O_5P$: P, 12.58. Found: P, 12.86.

EXAMPLE 2

*1:1 adduct of alpha-naphthoquinone and diethyl phosphite*

Two pieces of sodium the size of a pea are dissolved in 35 grams of diethyl phosphite. After the sodium has dissolved the solution is added slowly with stirring to a solution of 31.6 grams of alpha-naphthoquinone in 200 cc. of dioxane. The reaction is exothermic and the temperature is allowed to rise to as high as 70° C. After the addition is complete the reaction mixture is heated on a steam bath for one-half hour and then poured into water, whereupon a brown, somewhat gummy solid precipitates. This is filtered off, washed with water and air-dried to yield 53.4 grams of brown solid. A sample of the product is recrystallized from a mixture of diethyl ether and petroleum ether to give a white crystalline solid melting at 97.99° C.

*Analysis.*—Calcd. for $C_{14}H_{17}O_4P$: P, 11.11. Found: P, 10.6.

EXAMPLE 3

*1:1 adduct of 2-methyl-alpha-naphthoquinone and diethyl phosphite*

Ten grams of 2-methyl-alpha-naphthoquinone are dissolved in 60 ml. of dioxane. A small piece of sodium is dissolved in 15 grams of diethyl phosphite. To this solution was slowly added the quinone solution. The reaction was exothermic and the temperature was allowed to rise as high as 80° C. The reaction flask was cooled with tap water to prevent higher temperature rise. After the reaction subsided the reaction mixture was heated for one hour on the steam bath, then poured into water, whereupon an oil precipitated which very soon solidified to a light tan colored solid. This was filtered off, washed with water and air-dried to yield 17 grams of solid. A sample recrystallized from a mixture of petroleum ether and dioxane was pure white in color and had a melting range of 142–148° C.

*Analysis.*—Calcd. for $C_{15}H_{19}O_4P$: P, 10.06. Found: P, 10.43.

Having thus described our invention, what we claim and desire to protect by Letters Patent is:

1. An adduct of a 1,4-quinone and a dialkyl phosphite.
2. An adduct of p-benzoquinone and a dialkyl phosphite.
3. An adduct of p-benzoquinone and diethyl phosphite.
4. An adduct of alpha-naphthoquinone and a dialkyl phosphite.
5. An adduct of alpha-naphthoquinone and diethyl phosphite.
6. An adduct of 2-methyl-alpha-naphthoquinone and a dialkyl phosphite.
7. An adduct of 2-methyl-alpha-naphthoquinone and diethyl phosphite.
8. The process of making an adduct of a 1,4-quinone and a dialkyl phosphite which comprises reacting said quinone and said dialkyl phosphite in the presence of a basic catalyst selected from the group consisting of alkali and alkaline earth metals, oxides, hydroxides and alcoholates and organic nitrogen bases, and recovering an adduct of said quinone and said dialkyl phosphite from the resulting reaction mixture.
9. The process of claim 8 wherein said catalyst is an alkali metal.
10. The process of claim 8 wherein said catalyst is metallic sodium.

ELBERT C. LADD.
MERLIN P. HARVEY.

No references cited.